United States Patent
Kato et al.

(10) Patent No.: US 10,519,288 B2
(45) Date of Patent: *Dec. 31, 2019

(54) RESIN MOLDED BODY MANUFACTURING METHOD, RESIN FILM MANUFACTURING METHOD, AND INJECTION MOLDED ARTICLE MANUFACTURING METHOD

(71) Applicant: ZEON CORPORATION, Chiyoda-ku, Tokyo (JP)

(72) Inventors: Masatsugu Kato, Tokyo (JP); Shigetaka Hayano, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/554,279

(22) PCT Filed: Mar. 8, 2016

(86) PCT No.: PCT/JP2016/057208
§ 371 (c)(1),
(2) Date: Aug. 29, 2017

(87) PCT Pub. No.: WO2016/143796
PCT Pub. Date: Sep. 15, 2016

(65) Prior Publication Data
US 2018/0079876 A1    Mar. 22, 2018

(30) Foreign Application Priority Data

Mar. 9, 2015 (JP) .................................. 2015-046498
Feb. 4, 2016 (JP) .................................. 2016-019608

(51) Int. Cl.
| | | |
|---|---|---|
| *C08J 5/18* | (2006.01) | |
| *B29C 45/00* | (2006.01) | |
| *C08K 7/14* | (2006.01) | |
| *B29K 23/00* | (2006.01) | |
| *B29K 105/12* | (2006.01) | |
| *B29K 509/08* | (2006.01) | |
| *C08G 61/02* | (2006.01) | |

(52) U.S. Cl.
CPC ............ *C08J 5/18* (2013.01); *B29C 45/0001* (2013.01); *C08K 7/14* (2013.01); *B29K 2023/38* (2013.01); *B29K 2105/12* (2013.01); *B29K 2509/08* (2013.01); *B29K 2995/0017* (2013.01); *C08G 61/02* (2013.01); *C08G 2261/3325* (2013.01); *C08G 2261/418* (2013.01); *C08G 2261/724* (2013.01); *C08J 2365/00* (2013.01)

(58) Field of Classification Search
None
See application file for complete search history.

(56) References Cited

U.S. PATENT DOCUMENTS

| | | | |
|---|---|---|---|
| 6,511,756 B1 * | 1/2003 | Obuchi ................. | C08G 61/08 156/244.11 |
| 2007/0185290 A1 | 8/2007 | Hayano et al. | |
| 2009/0176950 A1 * | 7/2009 | Katsuda .............. | C07F 15/0053 526/172 |
| 2015/0240008 A1 * | 8/2015 | Schrock ................. | C07F 11/00 525/332.1 |

FOREIGN PATENT DOCUMENTS

| | | |
|---|---|---|
| JP | 2005089744 A | 4/2005 |
| JP | 2013139513 A | 7/2013 |
| JP | 2014520103 A | 8/2014 |
| JP | 5896194 B1 | 3/2016 |
| WO | 2012167171 A2 | 12/2012 |

OTHER PUBLICATIONS

Jun. 7, 2016, International Search Report issued in the International Patent Application No. PCT/JP2016/057208.

* cited by examiner

*Primary Examiner* — Robert T Butcher
(74) *Attorney, Agent, or Firm* — Kenja IP Law PC

(57) ABSTRACT

The present invention is a method for producing a resin-formed article, the method comprising melt-forming a forming material including a hydrogenated syndiotactic crystalline dicyclopentadiene ring-opening polymer with an initial melting temperature of 260° C. or higher and a syndiotacticity higher than 90%. Thus provided is a method for producing a resin-formed article sufficiently reflecting the properties of the hydrogenated crystalline dicyclopentadiene ring-opening polymer.

5 Claims, No Drawings

RESIN MOLDED BODY MANUFACTURING METHOD, RESIN FILM MANUFACTURING METHOD, AND INJECTION MOLDED ARTICLE MANUFACTURING METHOD

TECHNICAL FIELD

The present invention relates to a method for producing a resin-formed article, including melt-forming a forming material containing a hydrogenated syndiotactic crystalline dicyclopentadiene ring-opening polymer.

BACKGROUND ART

A hydrogenated ring-opening polymer of a norbornene-based monomer such as dicyclopentadiene is a type of so-called cycloolefin polymer that exhibits excellent transparency, low birefringence, forming processability and the like, and thus is used as a material that can be applied to various applications such as optical applications.

A hydrogenated ring-opening polymer of dicyclopentadiene is normally obtained in the form of an amorphous polymer that has an atactic structure. However, the amorphous hydrogenated ring-opening polymer of dicyclopentadiene having the atactic structure may exhibit insufficient heat resistance, mechanical strength, solvent resistance and the like depending on the application. Hence, as a measure for improving the performance of such a hydrogenated ring-opening polymer, a hydrogenated ring-opening polymer of dicyclopentadiene that has crystallinity by producing a hydrogenated ring-opening polymer of dicyclopentadiene having a tactic structure on its main chain has been proposed.

For example, Patent Literature 1 discloses that a dicyclopentadiene ring-opening polymer having cis-syndio regularity that is soluble in a hydrocarbon solvent such as a cyclohexane at room temperature is obtained by subjecting dicyclopentadiene to ring-opening polymerization through the use of a polymerization catalyst that mainly includes a group 6 transition metal compound having a specific substituent such as a phenylimidotungsten tetrachloride diethyl ether complex, and furthermore a hydrogenated syndiotactic crystalline dicyclopentadiene ring-opening polymer having crystallinity is obtained by hydrogenating the carbon-carbon double bonds included in the ring-opening polymer through the use of a mixture of a bis(tricyclohexylphosphine)benzylideneruthenium(IV) dichloride and ethyl vinyl ether or the like, as a hydrogenation catalyst. In addition, Patent Literature 2 discloses that a crystalline dicyclopentadiene ring-opening polymer having cis-iso regularity that is insoluble in a hydrocarbon solvent such as cyclohexane at room temperature is obtained by subjecting dicyclopentadiene to ring-opening polymerization through the use of a polymerization catalyst that mainly includes a group 4 to 6 transition metal compounds that include a specific aromatic dioxy group as a ligand such as a phenylimidotungsten bisphenolate complex, and a hydrogenated isotactic crystalline dicyclopentadiene ring-opening polymer having crystallinity is obtained by hydrogenating the carbon-carbon double bonds included in the ring-opening polymer through the use of $RuHCl(CO)(PPh_3)_2$ or the like as a hydrogenation catalyst.

CITATION LIST

Patent Literature

PTL 1: JP-A-2005-089744 (US2007/0185290A1)
PTL 2: JP-A-2013-139513

SUMMARY OF INVENTION

Technical Problem

A review by the present inventor about the hydrogenated syndiotactic crystalline dicyclopentadiene ring-opening polymer specifically described in Patent Literature 1 indicated that this hydrogenated syndiotactic crystalline dicyclopentadiene ring-opening polymer had a melting point as high as about 270° C., but when the polymer was heated, it began to soften (melt) from lower than 260° C., and thus a substantial upper temperature limit of the heat resistance was lower than 260° C.

Meanwhile, in the hydrogenated isotactic crystalline dicyclopentadiene ring-opening polymer specifically described in Patent Literature 2, its isotacticity was 100% within the measurement accuracy for the analyzer, and its melting point was about 295° C. which was extremely high. However, the dicyclopentadiene ring-opening polymer having a cis-isotactic structure was insoluble in a hydrocarbon solvent such as cyclohexane at room temperature, and thus the polymer was difficult to produce in an industrial production scale.

Accordingly, there were situations where the hydrogenated crystalline dicyclopentadiene ring-opening polymer having more excellent heat resistance and the like was expected as a raw resin of various resin-formed articles, but the hydrogenated crystalline dicyclopentadiene ring-opening polymer having such properties was hard to industrially handle, and the properties of the hydrogenated crystalline dicyclopentadiene ring-opening polymer were not able to be fully utilized.

Hence, an object of the present invention is to provide a method for producing a resin-formed article sufficiently reflecting the properties of the hydrogenated crystalline dicyclopentadiene ring-opening polymer.

Solution to Problem

As a result of extensive studies in order to achieve the above object, the present inventor has found that a hydrogenated syndiotactic crystalline dicyclopentadiene ring-opening polymer having high initial melting temperature and high tactic structure exhibits excellent heat resistance. Furthermore, the inventor has found that the properties included in this polymer can be sufficiently exhibited by using a melt forming method as a forming method. The present invention has been completed based on these findings.

In this way, one aspect of the invention provides a method for producing the following resin-formed article.

[1] A method for producing a resin-formed article, the method including melt-forming a forming material containing a hydrogenated syndiotactic crystalline dicyclopentadiene ring-opening polymer with an initial melting temperature of 260° C. or higher and a syndiotacticity higher than 90%.

[2] The method for producing the resin-formed article according to [1], wherein the forming material further includes an inorganic filler.

[3] A method for producing a resin film, the method including extrusion-forming a forming material containing a hydrogenated syndiotactic crystalline dicyclopentadiene ring-opening polymer with an initial melting temperature of 260° C. or higher and a syndiotacticity higher than 90%.

[4] A method for producing an injection-formed article, the method including injection-forming a forming material containing a hydrogenated syndiotactic crystalline dicyclopentadiene ring-opening polymer with an initial melting temperature of 260° C. or higher and a syndiotacticity higher than 90%.

Advantageous Effects of Invention

One aspect of the invention provides a method for producing a resin-formed article sufficiently reflecting the properties of the hydrogenated crystalline dicyclopentadiene ring-opening polymer.

DESCRIPTION OF EMBODIMENTS

The method for producing the resin-formed article according to one embodiment of the invention includes melt-forming the forming material containing a hydrogenated syndiotactic crystalline dicyclopentadiene ring-opening polymer with an initial melting temperature of 260° C. or higher and a syndiotacticity higher than 90%.

[Forming Material]

The forming material used in the producing method according to one embodiment of the invention contains the hydrogenated syndiotactic crystalline dicyclopentadiene ring-opening polymer with an initial melting temperature of 260° C. or higher and a syndiotacticity higher than 90% (hereinafter referred to as "hydrogenated dicyclopentadiene ring-opening polymer (α)" in some cases).

The hydrogenated dicyclopentadiene ring-opening polymer (α) includes a hydrogenated poly (endo-dicyclopentadiene) repeating unit represented by the following formula (1).

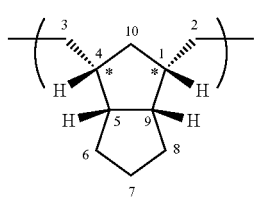

(1)

The initial melting temperature of the hydrogenated dicyclopentadiene ring-opening polymer (α) is 260° C. or higher, and preferably 265° C. or higher. The upper limit of the initial melting temperature is not particularly limited, but it is the melting point or lower. Since the hydrogenated dicyclopentadiene ring-opening polymer (α) has a considerably high initial melting temperature, the resin-formed article obtained by the producing method according to one embodiment of the invention has excellent heat resistance. In the present invention, the initial melting temperature means an initial melting temperature (hereinafter referred to as "initial melting point after annealing" in some cases) measured after the hydrogenated dicyclopentadiene ring-opening polymer (α) is once sufficiently molten and then sufficiently crystallized. For example, this initial melting temperature can be measured according to the method for measuring the initial melting point after annealing in Examples described below.

The melting point of the hydrogenated dicyclopentadiene ring-opening polymer (α) is preferably from 270 to 300° C., and more preferably from 270 to 290° C. Since the hydrogenated crystalline dicyclopentadiene ring-opening polymer (α) has a moderately high melting point, it has excellent heat resistance and can suppress oxidation and deterioration during forming. On the other hand, when the melting point of the hydrogenated crystalline dicyclopentadiene ring-opening polymer is too high, forming would be carried out at a high temperature because of poor forming processability, and thus the hydrogenated crystalline dicyclopentadiene ring-opening polymer is easily oxidized and deteriorated.

In the present invention, the melting point means a melting point measured after the hydrogenated dicyclopentadiene ring-opening polymer (α) is once sufficiently molten and then sufficiently crystallized. This melting point can be measured e.g. according to the method described in Examples below.

The hydrogenated dicyclopentadiene ring-opening polymer (α) has a tactic structure since the carbon atoms indicated by (1, 4) in the above formula (1) are asymmetric carbon atoms (indicated by *).

The hydrogenated dicyclopentadiene ring-opening polymer (α) is a polymer that has syndiotactic tactic structure and has a syndiotacticity i.e. a ratio of racemo diads relative to the total of meso diads and racemo diads in the steric configuration (hereinafter may be simply referred to as "ratio of racemo diad") being higher than 90%. In the hydrogenated dicyclopentadiene ring-opening polymer (α), the ratio of the racemo diads is preferably higher than 91%, more preferably higher than 92%.

When the ratio of the racemo diads is 90% or less, the crystallinity of the hydrogenated syndiotactic crystalline dicyclopentadiene ring-opening polymer is greatly decreased, and properties such as the high melting point and the processability are impaired.

Specifically, the syndiotacticity can be determined by the formula I: [(racemo diad)/(meso diad+racemo diad)×100 (%)].

The ratio of the racemo diads can be calculated by analyzing $^{13}$C-NMR spectrum of the hydrogenated dicyclopentadiene ring-opening polymer (α). Specifically, the ratio of racemo diads can be determined by measuring quantitatively the spectrum of the carbon atoms indicated by (5, 9) in the above formula (1) of the hydrogenated dicyclopentadiene ring-opening polymer (α). That is, the $^{13}$C-NMR spectrum measurement for the carbon atoms indicated by (5, 9) included in the repeating unit represented by the above formula (1) is carried out at 200° C. in an o-dichlorobenzene-$d_4$/trichlorobenzene [mixing ratio (weight basis):1/2] mixed solvent, and a peak area value of the signal derived from the meso diad at 43.35 ppm and a peak area value of the signal derived from the racemo diad at 43.43 ppm are substituted into the above formula 1 for calculation to determine the ratio of the racemo diads.

The hydrogenated dicyclopentadiene ring-opening polymer (a) has a repeating unit derived from dicyclopentadiene represented by the following formula (2).

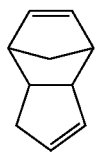
(2)

From the viewpoint that the hydrogenated dicyclopentadiene ring-opening polymer (α) particularly improves the heat resistance of a forming material including it and accelerates its crystallization rate thereof, a polymer including a large number of dicyclopentadiene-derived repeating units is preferable. The ratio of the dicyclopentadiene-derived repeating units relative to all repeating units in the hydrogenated dicyclopentadiene ring-opening polymer (α) is not particularly limited, but the ratio is preferably 90 wt % or more, more preferably 95 wt % or more, particularly preferably 97 wt % or more, and most preferably the polymer consists only of the dicyclopentadiene-derived repeating units.

As mentioned below, the hydrogenated dicyclopentadiene ring-opening polymer (α) can be efficiently obtained by subjecting dicyclopentadiene or a monomer mixture including dicyclopentadiene and other cycloolefin monomers (hereinafter referred collectively to as "dicyclopentadiene and the like" in some cases) to ring-opening polymerization in the presence of a specific ring-opening polymerization catalyst to obtain a dicyclopentadiene ring-opening polymer and then hydrogenate the obtained polymer.

The dicyclopentadiene includes endo and exo stereoisomers, and both of them can be used as a monomer, either of which can be used alone, or an isomer mixture including the endo and exo stereoisomers in an arbitrary ratio can be used. From the viewpoint of increasing the crystallinity of the hydrogenated dicyclopentadiene ring-opening polymer (α) and particularly improving its heat resistance, it is preferable to increase the ratio of one stereoisomer. The dicyclopentadiene to be used has the ratio of the endo or exo stereoisomer preferably 90% or more, more preferably 95% or more, and particularly preferably 99% or more. Note that, from the viewpoint of ease of synthesis, it is preferable that the stereoisomer increasing the ratio is preferably the endo stereoisomer.

In producing the hydrogenated dicyclopentadiene ring-opening polymer (α), dicyclopentadiene can also be used in combination with another cycloolefin monomer. The use amount of the other cycloolefin monomer is normally less than 10 wt %, preferably less than 3 wt %, more preferably less than 1 wt %, and most preferably 0 wt %, based on the total amount of dicyclopentadiene and other cycloolefin monomer.

Examples of other cycloolefin monomer that can be used in combination with dicyclopentadiene include the followings:

cycloalkenes such as cyclopentene, cyclohexene and cycloheptane;

dicyclopentadienes each having a substituent, or a dicyclopentadiene as a monomer obtained by saturating the double bond of the 5-membered ring included in dicyclopentadiene;

norbornenes each of which is unsubstituted or each having an alkyl group as a substituent, such as norbornene, 5-methylnorbornene, 5-ethylnorbornene, 5-butylnorbornene, 5-hexylnorbornene, 5-decylnorbornene, 5-cyclohexylnorbornene and 5-cyclopentylnorbornene;

norbornenes each having an alkenyl group as a substituent, such as 5-ethylidenenorbornane, 5-vinylnorbornene, 5-propenylnorbornene, 5-cyclohexenylnorbornene and 5-cyclopentenylnorbornene;

norbornenes each having an aromatic ring as a substituent, such as 5-phenylnorbornene;

norbornenes each having an oxygen atom-containing polar group, such as 5-methoxycarbonylnorbornene, 5-ethoxycarbonylnorbornene, 5-methyl-5-methoxycarbonylnorbornene, 5-methyl-5-ethoxycarbonylnorbornene, norbornenyl-2-methyl propionate, norbornenyl-2-methyl octanoate, norbornene-5,6-dicarboxylic anhydride, 5-(hydroxymethyl)norbornene, 5,6-di(hydroxymethyl)norbornene, 5,5-di(hydroxymethyl)norbornene, 5-hydroxy-i-propylnorbornene, 5,6-dicarboxynorbornene, and 5-methoxycarbonyl-6-carboxynorbornene; and norbornenes each having a nitrogen atom-containing polar group, such as 5-cyanonorbornene and norbornene-5,6-dicarboxylic acid imide.

In addition, examples of tetracyclododecenes other than tetracyclododecene include the following: tetracyclododecenes each having an alkyl group as a substituent, such as 8-methyltetracyclododecene, 8-ethyltetracyclododecene, 8-cyclohexyltetracyclododecene and 8-cyclopentyltetracyclododecene;

tetracyclododecenes each having a double bond outside the ring, such as 8-methylidenetetracyclododecene, 8-ethylidenetetracyclododecene, 8-vinyltetracyclododecene, 8-propenyltetracyclododecene, 8-cyclohexenyltetracyclododecene, and 8-cyclopentenyltetracyclododecene;

tetracyclododecenes each having an aromatic ring, such as 8-phenyltetracyclododecene;

tetracyclododecenes each having an oxygen atom-containing substituent, such as 8-methoxycarbonyltetracyclododecene, 8-methyl-8-methoxycarbonyltetracyclododecene, 8-hydroxymethyltetracyclododecene, 8-carboxytetracyclododecene, tetracyclododecene-8,9-dicarboxylic acid, and tetracyclododecene-8,9-dicarboxylic anhydride;

tetracyclododecenes each having a nitrogen atom-containing substituent, such as 8-cyanotetracyclododecene and tetracyclododecene-8,9-dicarboxylic acid imide;

tetracyclododecenes each having a halogen atom-containing substituent, such as 8-chlorotetracyclododecene;

tetracyclododecenes each having a silicon atom-containing substituent, such as 8-trimethoxysilyltetracyclododecene;

Examples of hexacycloheptadecenes include the followings: hexacycloheptadecenes each of which is unsubstituted or each having an alkyl group as a substituent, such as hexacycloheptadecene, 12-methylhexacycloheptadecene, 12-ethylhexacycloheptadecene, 12-cyclohexylhexacycloheptadecene and 12-cyclopentylhexacycloheptadecene;

hexacycloheptadecenes each having a double bond outside the ring, such as 12-methylidenehexacycloheptadecene, 12-ethylidenehexacycloheptadecene, 12-vinylhexacycloheptadecene, 12-propenylhexacycloheptadecene, 12-cyclohexenylhexacycloheptadecene and 12-cyclopentenylhexacycloheptadecene;

hexacycloheptadecenes each having an aromatic ring as a substituent, such as 12-phenylhexacycloheptadecene;

hexacycloheptadecenes each having an oxygen atom-containing substituent, such as 12-methoxycarbonylhexacycloheptadecene, 12-methyl-12-methoxycarbonylhexacycloheptadecene, 12-hydroxymethylhexacycloheptadecene, 12-carboxyhexacycloheptadecene, hexacycloheptadecene-12,13-dicarboxylic acid and hexacycloheptadecene-12,13-dicarboxylic anhydride;

hexacycloheptadecenes each having a nitrogen atom-containing substituent, such as 12-cyanohexacycloheptadecene and hexacycloheptadecene-12,13-dicarboxylic acid imide;

hexacycloheptadecenes each having a halogen atom-containing substituent, such as 12-chlorohexacycloheptadecene;

hexacycloheptadecenes each having a silicon atom-containing substituent, such as 12-trimethoxysilylhexacycloheptadecene; and tetracyclo[6.5.1$^{2,5}$.0$^{1,6}$.0$^{8,13}$]trideca-3,8,10,12-tetraene (also referred to as 1,4-methano-1,4,4a,9a-tetrahydrofluorene); tetracyclo[6.6.1$^{2,5}$.0$^{1,6}$.0$^{8,13}$]tetradeca-3,8,10,12-tetraene (also referred to as 1,4-methano-1,4,4a,5,10,10a-hexahydroanthracene); and the like.

The number average molecular weight (Mn) of the hydrogenated dicyclopentadiene ring-opening polymer (α) is normally 500 to 1,000,000, preferably 1,000 to 600,000, and more preferably 2,000 to 400,000. If the Mn is too low, the mechanical strength of the resin-formed article may be decreased. If the Mn is too high, the polymer tends to be difficult to be formed. Note that the number average molecular weight of the hydrogenated dicyclopentadiene ring-opening polymer (α) is almost equal to the number average molecular weight of the dicyclopentadiene ring-opening polymer before a hydrogenation process.

The glass transition temperature (Tg) of the hydrogenated dicyclopentadiene ring-opening polymer (α) is preferably 80° C. or higher, and more preferably 85° C. or higher. If the glass transition temperature is within this range, the polymer is suitable because of good heat resistance e.g. high deflection temperature under load. The upper limit of the glass transition temperature is not particularly limited, but is approximately 120° C.

The dicyclopentadiene ring-opening polymer that is an intermediate for producing the hydrogenated cyclopentadiene ring-opening polymer (α) can be efficiently obtained by subjecting the dicyclopentadiene or the like to ring-opening polymerization by using a polymerization catalyst including a tungsten compound represented by the following formula (3).

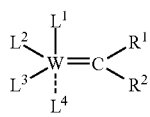

(3)

In the formula (3), W represents a tungsten atom.

Each of $R^1$ and $R^2$ independently represents a group selected from a hydrogen atom, an alkyl group having 1 to 12 carbon atoms that may have a substituent, an aryl group having 6 to 12 carbon atoms that may have a substituent, and a cycloalkyl group having 3 to 20 carbon atoms that may have a substituent.

$L^1$ represents a nitrogen atom that may have a substituent selected from an alkyl group having 1 to 12 carbon atoms that may have a substituent, an aryl group having 6 to 12 carbon atoms that may have a substituent and a cycloalkyl group having 3 to 20 carbon atoms that may have a substituent.

$L^2$ represents a conjugated heterocyclic group having at least one nitrogen atom and having 5 to 15-membered rings, where the conjugated heterocyclic group may have a substituent.

$L^3$ represents an alkoxy group represented by —O—$R^3$, where the $R^3$ represents a group selected from an alkyl group having 1 to 12 carbon atoms that may have a substituent and an aryl group having 6 to 30 carbon atoms that may have a substituent.

$L^4$ represents a neutral conjugated heterocyclic ligand having at least two nitrogen atoms and having 12 to 24-membered rings, where the conjugated heterocyclic ligand may have a substituent.

In formula (3), W represents a tungsten atom.

Each of $R^1$ and $R^2$ independently represents a hydrogen atom; an alkyl group having 1 to 12 carbon atoms that may have a substituent, such as a methyl group, an ethyl group, an n-propyl group, an isopropyl group, an n-butyl group, an isobutyl group and a t-butyl group; a cycloalkyl group having 3 to 20 carbon atoms that may have a substituent, such as a cyclopropyl group, a cyclopentyl group, a cyclohexyl group; or an aryl group having 6 to 12 carbon atoms that may have a substituent. Examples of an aryl group of the aryl group that may have a substituent include a phenyl group, a 1-naphthyl group, a 2-naphthyl group and the like. In addition, examples of the substituents in the alkyl group having 1 to 12 carbon atoms, the cycloalkyl group having 3 to 20 carbon atoms and the aryl group having 6 to 12 carbon atoms include an alkyl group having 1 to 12 carbon atoms such as a methyl group and an ethyl group; a halogen atom such as a fluorine atom, a chlorine atom and a bromine atom; an alkoxy group having 1 to 12 carbon atoms such as a methoxy group, an ethoxy group and an isopropoxy group; a haloalkyl group having to 12 carbon atoms such as a trifluoromethyl group; a haloalkoxy group having 1 to 12 carbon atoms such as a trifluoromethoxy group; an aryl group having 6 to 12 carbon atoms that may have a substituent, such as a phenyl group, a 4-methylphenyl group, a 2,4-dimethylphenyl group, a 2-chlorophenyl group and a 3-methoxyphenyl group; and the like.

$L^1$ represents a nitrogen atom that may have a substituent selected from an alkyl group having 1 to 12 carbon atoms that may have a substituent, an aryl group having 6 to 12 carbon atoms that may have a substituent and a cycloalkyl group having 3 to 20 carbon atoms that may have a substituent. That is, $L^1$ is a group represented by =N—$R^4$ ($R^4$ represents a hydrogen atom, or a group selected from an alkyl group having 1 to 12 carbon atoms that may have a substituent, an aryl group having 6 to 12 carbon atoms that may have a substituent, and a cycloalkyl group having 3 to 20 carbon atoms that may have a substituent).

The alkyl group having 1 to 12 carbon atoms of the substituent ($R^4$) that can be included in the nitrogen atom of $L^1$ may be either linear or branched. Specific examples thereof include a methyl group, an ethyl group, a propyl group, an isopropyl group, a butyl group, a t-butyl group, a pentyl group, a hexyl group and the like.

Examples of the aryl group having 6 to 12 carbon atoms of $R^4$ include a phenyl group, a 1-naphthyl group and a 2-naphthyl group and the like.

Examples of the cycloalkyl group having 3 to 20 carbon atoms of $R^4$ include a cyclopropyl group, a cyclopentyl group, a cyclohexyl group, a cyclooctyl group, an adamantyl group and the like.

The substituent that can be included in the alkyl group having 1 to 12 carbon atoms, the cycloalkyl group having 3 to 20 carbon atoms, or the aryl group having 6 to 12 carbon atoms of the $R^4$, is not particularly limited.

Examples of the substituent that can be included in the alkyl group having 1 to 12 carbon atoms of the $R^4$ include a halogen atom such as a fluorine atom, a chlorine atom and a bromine atom; an alkoxy group having 1 to 12 carbon atoms such as a methoxy group, an ethoxy group and an isopropoxy group; an aryl group having 6 to 12 carbon atoms that may have a substituent, such as a phenyl group, a 2-methylphenyl group, a 4-methylphenyl group, a 2,4-dimethylphenyl group, a 2-chlorophenyl group, a 3-methoxyphenyl group, a 2,6-dimethylphenyl group, a 3,5-dimethylphenyl group and a pentafluorophenyl group; an amino group; a monosubstituted amino group such as a methylamino group; a disubstituted amino group such as a dimethylamino group; an imino group; and the like.

Examples of the substituent that may be included in the cycloalkyl group having 3 to 20 carbon atoms or the aryl group having 6 to 12 carbon atoms of the $R^4$ include an alkyl group having 1 to 12 carbon atoms such as a methyl group, an ethyl group and an isopropyl group; a halogen atom such as a fluorine atom, a chlorine atom and a bromine atom; an alkoxy group having 1 to 12 carbon atoms such as a methoxy group, an ethoxy group and an isopropoxy group, a haloalkyl group having 1 to 12 carbon atoms such as a trifluoromethyl group; a haloalkoxy group having 1 to 12 carbon atoms such as a trifluoromethoxy group; an aryl group having 6 to 12 carbon atoms that may have a substituent, such as a phenyl group, a 2-methylphenyl group, a 4-methylphenyl group, a 2,4-dimethylphenyl group, a 2-chlorophenyl group, a 3-methoxyphenyl group, a 2,6-dimethylphenyl group, a 3,5-dimethylphenyl group and a pentafluorophenyl group; an amino group; a monosubstituted amino group such as a methylamino group; a disubstituted amino group such as a dimethylamino group; an imino group; and the like.

$L^2$ represents a conjugated heterocyclic group having at least one nitrogen atom and having 5 to 15-membered rings, that may have a substituent.

Examples of the conjugated heterocyclic group of $L^2$ include a 5-membered ring conjugated heterocyclic group such as a pyrrolyl group, an imidazolyl group, a pyrazolyl group, an oxazolyl group, and a thiazolyl group; a 6-membered ring conjugated heterocyclic group such as a pyridyl group, a pyridazinyl group, a pyrimidinyl group, a pyrazinyl group and a triazinyl group; a fused ring conjugated heterocyclic group such as a quinazolinyl group, a phthalazinyl group and a pyrrolopyridyl group; and the like.

The substituent that can be included in the conjugated heterocyclic group is not particularly limited. Its examples include an alkyl group having 1 to 12 carbon atoms such as a methyl group and an ethyl group; a halogen atom such as a fluorine atom, a chlorine atom and a bromine atom; an alkoxy group having 1 to 12 carbon atoms such as a methoxy group, an ethoxy group and an isopropoxy group; a haloalkyl group having 1 to 12 carbon atoms such as a trifluoromethyl group; a haloalkoxy group having 1 to 12 carbon atoms such as a trifluoromethoxy group; an aryl group having 6 to 12 carbon atoms that may have a substituent, such as a phenyl group, a 4-methylphenyl group, a 2,4-dimethylphenyl group, a 2-chlorophenyl group and a 3-methoxyphenyl group; an amino group; a monosubstituted amino group such as a methylamino group; a disubstituted amino group such as a dimethylamino group; an imino group; and the like.

$L^3$ is a group represented by —O—$R^3$. $R^3$ is a group selected from an alkyl group having 1 to 12 carbon atoms that may have a substituent and an aryl group having 6 to 30 carbon atoms that may have a substituent.

Examples of the alkyl group having 1 to 12 carbon atoms among the alkyl groups each having 1 to 12 carbon atoms that may have a substituent of the $R^3$, include a methyl group, an ethyl group, a propyl group, an isopropyl group, a butyl group, a t-butyl group, a pentyl group and the like.

The substituent that can be included in the alkyl group having 1 to 12 carbon atoms of the $R^3$ is not particularly limited. Its examples include a halogen atom such as a fluorine atom, a chlorine atom and a bromine atom; an alkoxy group having 1 to 12 carbon atoms such as a methoxy group, an ethoxy group and an isopropoxy group; a haloalkyl group having 1 to 12 carbon atoms such as a trifluoromethyl group; a haloalkoxy group having 1 to 12 carbon atoms such as a trifluoromethoxy group; an aryl group having 6 to 12 carbon atoms that may have a substituent, such as a phenyl group, a 4-methylphenyl group, a 2,4-dimethylphenyl group, a 2-chlorophenyl group and a 3-methoxyphenyl group; an amino group; a monosubstituted amino group such as a methylamino group; a disubstituted amino group such as a dimethylamino group; an imino group; and the like.

Examples of the aryl group having 6 to 30 carbon atoms among the aryl groups each having 6 to 30 carbon atoms that may have a substituent, include a phenyl group, a 1-naphthyl group, a 2-naphthyl group, an adamantyl group and the like.

The substituent that can be included in the aryl group having 6 to 30 carbon atoms of the $R^3$ is not particularly limited. Its examples include a halogen atom such as a fluorine atom, a chlorine atom and a bromine atom; an alkyl group having 1 to 12 carbon atoms such as a methyl group, an ethyl group, an isopropyl group and a t-butyl group; a cycloalkyl group having 3 to 20 carbon atoms such as a cyclopropyl group, a cyclopentyl group and a cyclohexyl group; an alkoxy group having 1 to 12 carbon atoms such as a methoxy group, an ethoxy group and an isopropoxy group; a haloalkyl group having 1 to 12 carbon atoms such as a trifluoromethyl group; a haloalkoxy group having 1 to 12 carbon atoms such as a trifluoromethoxy group; an aryl group having 6 to 12 carbon atoms that may have a substituent, such as a phenyl group, a 4-methylphenyl group, a 2,4-dimethylphenyl group, a 2-chlorophenyl group and a 3-methoxyphenyl group; an amino group; a monosubstituted amino group such as a methylamino group; a disubstituted amino group such as a dimethylamino group; an imino group; and the like.

Specific examples of the $L^3$ include a group which is an alkyl group having 1 to 12 carbon atoms in which the $R^3$ may have a substituent, such as a 1, 1, 1, 3, 3, 3-hexafluoro-2-propoxy group, a 2-methyl-2-propoxy group, a 1,1,1-trifluoro-2-methyl-2-propoxy group, a 1,1,1-trifluoro-2-trifluoromethyl-2-propoxy group and a 2-trifluoromethyl-2-phenyl-1,1,1-trifluoroethoxy group; a group which is an aryl group having 6 to 30 carbon atoms in which the $R^3$ may have a substituent, such as a 2,6-bis(2,4,6-trimethylphenyl)phenoxy group, a 2,6-bis(2,4,6-triisopropylphenyl)phenoxy group, a 2,4,6-trimethylphenoxy group and a 2,3,5,6-tetraphenylphenoxy group.

$L^4$ is a neutral conjugated heterocyclic ligand having at least two nitrogen atoms and having 12 to 24-membered rings. Specific examples of the ligand include 2,2'-bipyridyl, 5,5'-dimethyl-2,2'-bipyridyl, 4,4'-dimethyl-2,2'-bipyridyl, 4,4'-dibromo-2,2'-bipyridyl, 2,2'-biquinoline, 1,10-phenanthroline and terpyridine.

In addition, the conjugated heterocyclic group of the $L^4$ may have a substituent. Examples of the substituent include the same substituents as listed as the substituents that can be included in the conjugated heterocyclic group of the $L^2$.

Specific examples of the tungsten compound include, but are not limited to, (2-trifluoromethyl-2-phenyl-1,1,1-trifluoroethoxy)2,6-dimethylphenylimide tungsten (VI) (2,5-dimethylpyrrolide) (neophylidene) (1,10-phenanthroline), (2-trifluoromethyl-2-phenyl-1,1,1-trifluoroethoxy) phenylimide tungsten (VI) (2,5-dimethylpyrrolide) (neophylidene) (1,10-phenanthroline), (2-trifluoromethyl-2-phenyl-1,1,1-trifluoroethoxy)2,6-dimethylphenylimide tungsten (VI) (2,5-dimethylpyrrolide) (neophylidene) (2,2'-bipyridine), (2-trifluoromethyl-2-phenyl-1,1,1-trifluoroethoxy) phenylimide tungsten (VI) (2,5-dimethylpyrrolide) (neophylidene) (2,2'-bipyridine), (2-trifluoromethyl-2-phenyl-1,1,1-trifluoroethoxy)-2,6-diisopropylphenylimide tungsten (VI) (2,5-dimethylpyrrolide) (neophylidene) (1,10-phenanthroline), (2-trifluoromethyl-2-phenyl-1,1,1-trifluoroethoxy)-2,6-diisopropylphenylimide tungsten (VI) (2,5-dimethylpyrrolide) (neophylidene) (2,2'-bipyridine), and the like.

In addition, the tungsten compound has a neutral conjugated heterocyclic ligand, but may be used in combination with a metal salt compound for increasing the rate of the ring-opening polymerization of dicyclopentadiene. By the simultaneous use of a metal salt compound, the neutral conjugated heterocyclic ligand can be separated from the tungsten compound to form highly active catalyst species.

Zinc, tin, copper, titanium, rare earth and the like are suitable as the metal atom constituting the metal salt. Specific examples of the metal salt that can be used include zinc chloride, copper chloride, tin chloride, titanium chloride, scandium chloride, yttrium chloride and the like.

These tungsten compounds can be produced in accordance with, for example, the method described in JP-T-2014-520103 (WO 2012/167171) or the like. Furthermore, those commercially available as tungsten compounds can be purified and used, as desired.

The dicyclopentadiene ring-opening polymer can be produced by mixing the dicyclopentadiene and the like with a polymerization catalyst, and subjecting the dicyclopentadiene and the like to ring-opening polymerization.

Although the use amount of the polymerization catalyst relative to dicyclopentadiene and the like is not particularly limited, the molar ratio of tungsten compound:dicyclopentadiene and the like in the polymerization catalyst is preferably 1:10 to 1:2,000,000, more preferably 1:200 to 1:1,000,000, and particularly preferably 1:500 to 1:500,000. If the use amount of the polymerization catalyst is too large, removal of the polymerization catalyst may be difficult, and if the use amount of the polymerization catalyst is too small, sufficient polymerization activity may not be obtained.

The polymerization reaction can be effected in a solvent-free system, but is preferably effected in an organic solvent from the viewpoint that the reaction is advantageously controlled. The organic solvent used in this case is not particularly limited as long as the organic solvent can dissolve or disperse the resulting ring-opening polymer and does not adversely affect the polymerization reaction. Specific examples of the organic solvent that can be used include an aliphatic hydrocarbon such as pentane, hexane and heptane; an alicyclic hydrocarbon such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindenecyclohexane and cyclooctane; an aromatic hydrocarbon such as benzene, toluene and xylene; a halogen-containing aliphatic hydrocarbon such as dichloromethane, chloroform and 1,2-dichloroethane; a halogen-containing aromatic hydrocarbon such as chlorobenzene and dichlorobenzene; a nitrogen-containing hydrocarbon such as nitromethane, nitrobenzene and acetonitrile; an ether such as diethyl ether and tetrahydrofuran; an aromatic ether such as anisole and phenetole; and the like. Among these, an aromatic hydrocarbon, an aliphatic hydrocarbon, an alicyclic hydrocarbon, an ether, and an aromatic ether are preferably used.

When effecting the polymerization reaction in the organic solvent, the concentration of the monomer in the reaction system is not particularly limited, but is preferably 1 to 50 wt %, more preferably 2 to 45 wt %, and particularly preferably 3 to 40 wt %. If the concentration of the monomer is too low, productivity may decrease, and if the concentration of the monomer is too high, the viscosity of the reaction solution after completion of the polymerization reaction may become too high, and the subsequent hydrogenation reaction may become difficult.

The polymerization temperature is not particularly limited, but is normally −30 to +200° C., and preferably 0 to 180° C. In addition, the polymerization time is also not particularly limited, but is normally selected within the range of 1 minute to 100 hours.

When effecting the polymerization reaction, a vinyl compound or a diene compound may be added to the polymerization reaction system in order to adjust the molecular weight of the resulting dicyclopentadiene ring-opening polymer.

The vinyl compound used for adjusting the molecular weight is not particularly limited as long as the vinyl compound is an organic compound having a vinyl group. For example, an α-olefin such as 1-butene, 1-pentene, 1-hexene and 1-octene; a styrene such as styrene and vinyltoluene; an ether such as ethyl vinyl ether, i-butyl vinyl ether and allyl glycidyl ether; a halogen-containing vinyl compound such as allyl chloride; an oxygen-containing vinyl compound such as allyl acetate, allyl alcohol and glycidyl methacrylate; a nitrogen-containing vinyl compound such as acrylamide; a silicon-containing vinyl compound such as vinyltrimethylsilane, allyltrimethylsilane and vinyltrimethoxysilane; and the like can be used.

Furthermore, the diene compound used for adjusting the molecular weight is not particularly limited. For example, a non-conjugated diene such as 1,4-pentadiene, 1,4-hexadiene, 1,5-hexadiene, 1,6-heptadiene, 2-methyl-1,4-pentadiene and 2,5-dimethyl-1,5-hexadiene; a conjugated diene such as 1,3-butadiene, 2-methyl-1,3-butadiene, 2,3-dimethyl-1,3-butadiene, 1,3-pentadiene and 1,3-hexadiene; and the like can be used.

The amount of the vinyl compound or diene compound to be added may be determined depending on the intended molecular weight, but is normally selected within a range of 0.1 to 10 mol based on 100 mol of the dicyclopentadiene and the like used as the monomer.

Thus, the ring-opening polymerization reaction of dicyclopentadiene can be effected under the above-mentioned conditions by using the polymerization catalyst including the tungsten compound represented by the above formula (3) to obtain a dicyclopentadiene ring-opening polymer having syndiotacticity.

In addition, the dicyclopentadiene ring-opening polymer having this syndiotacticity can be subjected to hydrogenation reaction to obtain a hydrogenated dicyclopentadiene ring-opening polymer (α) having syndiotacticity as well as crystallinity.

Note that the dicyclopentadiene ring-opening polymer may be collected from the reaction mixture, and then subjected to the hydrogenation reaction, or the reaction mixture including the dicyclopentadiene ring-opening polymer can also be directly subjected to the hydrogenation reaction.

The number average molecular weight (Mn) of the dicyclopentadiene ring-opening polymer to be subjected to the hydrogenation reaction, determined by $^1$H-NMR, is not particularly limited, but is preferably 1,000 to 1,000,000, and more preferably 2,000 to 800,000. A hydrogenated dicyclopentadiene ring-opening polymer (α) which exhibits particularly an excellent balance between forming processability and heat resistance, can be obtained by subjecting dicyclopentadiene ring-opening polymer having such a number average molecular weight to the hydrogenation reaction. The number average molecular weight of the hydrogenated dicyclopentadiene ring-opening polymer (α) can be regulated by adjusting the addition amount or the like of the molecular weight modifier to be used in polymerization.

The cis content in the dicyclopentadiene ring-opening polymer to be subjected to the hydrogenation reaction, determined by $^1$H-NMR, is preferably higher than 50%, more preferably higher than 70%, and particularly preferably higher than 90%.

In the dicyclopentadiene ring-opening polymer, the ratio of the racemo diads is preferably higher than 90%, more preferably higher than 91%, and particularly preferably higher than 92%. When the cis content is higher than 50% and the ratio of the racemo diads is higher than 90%, the solubility of the dicyclopentadiene ring-opening polymer in an organic solvent increases, and the production process for directly subjecting the reaction solution containing the dicyclopentadiene ring-opening polymer to hydrogenation reaction is advantageous, and thus the ratio is preferable.

As described above, the dicyclopentadiene ring-opening polymer that can be used as an intermediate for producing the hydrogenated dicyclopentadiene ring-opening polymer (α) dissolves in an organic solvent at room temperature. In particular, from the viewpoint of the production process in which the polymerization reaction is effected in an organic solvent and the organic solvent reaction solution containing the dicyclopentadiene ring-opening polymer is directly subjected to the hydrogenation reaction, it is preferable to dissolve the polymer in an organic solvent inert to hydrogenation.

Examples of the solvent for dissolving the dicyclopentadiene ring-opening polymer include an alicyclic hydrocarbon such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindenecyclohexane and cyclooctane; an aromatic hydrocarbon such as benzene, toluene and xylene; a halogen-containing aliphatic hydrocarbon such as dichloromethane, chloroform and 1,2-dichloroethane; a halogen-containing aromatic hydrocarbon such as chlorobenzene and dichlorobenzene; an ether such as diethyl ether and tetrahydrofuran; an aromatic ether such as anisole and phenetole; and the like.

The hydrogenation reaction of the dicyclopentadiene ring-opening polymer can be effected, e.g., by a method (a) in which a hydrogenating agent is added to a system including the dicyclopentadiene ring-opening polymer, and then heated and reacted, or by a method (b) in which a hydrogenation catalyst is added and then hydrogen is added to the same system, and then the carbon-carbon double bond included in the dicyclopentadiene ring-opening polymer is hydrogenated. Among them, from the viewpoint of industrial production, the method (b) in which the hydrogenation reaction of the dicyclopentadiene ring-opening polymer is effected using the hydrogenation catalyst and the hydrogen gas is preferable.

In the method (a), it is preferable that a hydrazine-containing compound as a hydrogenating agent for a transfer hydrogenation is used to hydrogenate the carbon-carbon double bond included in the dicyclopentadiene ring-opening polymer.

The compound used as a hydrogenating agent for a transfer hydrogenation is not particularly limited. The compound used as a hydrogenating agent for the dicyclopentadiene ring-opening polymer may be a compound used as a hydrogenation catalyst. Specific examples of the hydrogenating agent include hydrazine, paratoluenesulfonyl hydrazide and the like.

There can be used, as the hydrogenation catalyst used in the method (b), a catalyst conventionally known as a hydrogenation catalyst for ring-opening polymers. Specific examples of the catalyst include $RuHCl(CO)(PPh_3)_3$, $RuHCl(CO)[P(p\text{-Me-Ph})_3]_3$, $RuHCl(CO)(PCy_3)_2$, $RuHCl(CO)[P(n\text{-Bu})_3]_3$, $RuHCl(CO)[P(i\text{-Pr})_3]_2$, $RuH_2(CO)(PPh_3)_3$, $RuH_2(CO)[P(p\text{-Me-Ph})_3]_3$, $RuH_2(CO)(PCy_3)_3$, $RuH_2(CO)[P(n\text{-Bu})_3]_3 RuH(OCOCH_3)(CO)(PPh_3)_2$, $RuH(OCOPh)(CO)(PPh_3)_2$, $RuH(OCOPh\text{-}CH_3)(CO)(PPh_3)_2$, $RuH(OCOPh\text{-}OCH_3)(CO)(PPh_3)_2$, $RuH(OCOPh)(CO)(PCY_3)_2$, Raney nickel, nickel diatomaceous earth, nickel acetate, palladium acetate, $PdCl_2$, $RhCl(PPh_3)_3$, and the like.

The hydrogenation reaction is normally effected in an inert organic solvent. Examples of the inert organic solvent that can be used include an alicyclic hydrocarbon such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindenecyclohexane and cyclooctane; an aromatic hydrocarbon such as benzene, toluene and xylene; a halogen-containing aliphatic hydrocarbon such as dichloromethane, chloroform and 1,2-dichloroethane; a halogen-containing aromatic hydrocarbon such as chlorobenzene and dichlorobenzene; an ether such as diethyl ether and tetrahydrofuran; an aromatic ether such as anisole and phenetole; and the like.

When producing the hydrogenated dicyclopentadiene ring-opening polymer (α), preferably, hydrogen is further added to a system including a dicyclopentadiene ring-opening polymer and a hydrogenation catalyst to thereby hydrogenate the carbon-carbon double bond present in the dicyclopentadiene ring-opening polymer.

In the hydrogenation reaction, appropriate condition ranges are also different depending on the hydrogenation catalyst to be used, and the reaction temperature is normally −20 to +250° C., preferably −10 to +220° C., and more preferably 0 to +200° C. If the hydrogenation temperature is too low, the reaction rate may become too slow, and if the hydrogenation temperature is too high, a side reaction may occur. In a case of a catalytic hydrogenation reaction, the hydrogen pressure is normally set to 0.01 to 20 MPa, preferably 0.05 to 15 MPa, and more preferably 0.1 to 10 MPa. If the hydrogen pressure is too low, the hydrogenation rate may become too slow, and if the hydrogen pressure is too high, the restrictions in an apparatus are generated in that a reactor that can endure high pressure is required. The hydrogenation time is not particularly limited as long as the hydrogenation ratio is given as desired, and is normally 0.1 to 10 hours. After completion of the hydrogenation reaction, the hydrogenated dicyclopentadiene ring-opening polymer (α) may be simply collected according to an ordinary method. In collecting the polymer, the residual catalyst can be removed by a procedure such as filtration.

The hydrogenation ratio of the dicyclopentadiene ring-opening polymer achieved by the hydrogenation reaction (the ratio of the hydrogenated main-chain double bonds) is not particularly limited, but is preferably 98% or more, more preferably 99% or more, and particularly preferably 99.5% or more. As the hydrogenation ratio increases, the resulting hydrogenated dicyclopentadiene ring-opening polymer (α) exhibits better heat resistance.

The forming material used in the producing method according to one of the present invention may contain an inorganic filler. The forming material used in the producing method according to one embodiment of the invention facilitates the production of a resin-formed article having more excellent heat resistance by containing an inorganic filler.

In particular, when the resin-formed article obtained by the producing method according to one embodiment of the invention is subjected to a reflow step, a resin-formed article more excellent in reflow heat resistance (difficulty to deform during reflow) can be easily obtained by using a forming material including an inorganic filler.

Examples of the inorganic filler include silica, alumina, zeolite, magnesia, titania, zinc oxide, calcium carbonate, magnesium carbonate, glass and the like.

Among them, a glass filler is preferable since it facilitates the production of a resin-formed article having more excellent heat resistance.

A known glass filler can be used as the glass filler, and its shape is not limited. In addition, the glass filler may be surface-treated with a silane-based compound, an epoxy-based compound, a urethane-based compound, or the like.

Examples of the glass filler include a glass fiber, a glass bead, a glass powder, a glass flake, a glass balloon and the like, and among them, the glass fiber is preferable.

The shape and the form of the glass fiber are not particularly limited. Specific examples of the glass fiber include a milled fiber, a cut fiber, a chopped strand, a roving, and the like, and among them, the chopped strand is preferable.

The length of the glass fiber is preferably 3 to 40 mm, and more preferably 5 to 30 mm. If the glass fiber is too short, the resin-formed article may exhibit low mechanical strength, and if the glass fiber is too long, the workability during kneading in preparing the forming material is worsened.

The glass fiber may have an arbitrary cross-sectional shape such as circular, elliptical, flat or rectangular shapes. In addition, these glass fibers can be used in an arbitrary ratio.

When the forming material used in the producing method according to one embodiment of the invention contains an inorganic filler, its content is preferably 5 to 60 wt %, and more preferably 15 to 50 wt % based on the total amount of the hydrogenated dicyclopentadiene ring-opening polymer (α) and the inorganic filler. When the content of the inorganic filler is too small, a resin-formed article having excellent heat resistance and strength during reflow may not be obtained. On the other hand, if the content of the inorganic filler is too large, a resin-formed article having a low dielectric loss tangent may be hardly obtained, or the formability of the forming material may be lowered.

The forming material used in the producing method according to one embodiment of the invention may contain components other than the hydrogenated dicyclopentadiene ring-opening polymer (α) and the inorganic filler. Examples of such components include additives such as an antioxidant, a UV absorber, a light stabilizer, a near-infrared absorber, a plasticizer, an antistatic agent, an acid scavenger, a flame retardant, and a flame retardant promoter.

Examples of the antioxidant include a phenol-based antioxidant, a phosphorus-based antioxidant, a sulfur-based antioxidant, and the like.

Examples of the phenol-based antioxidant include 3,5-di-t-butyl-4-hydroxytoluene, dibutylhydroxytoluene, 2,2'-methylenebis(6-t-butyl-4-methylphenol), 4,4'-butylidenebis(3-t-butyl-3-methylphenol), 4,4'-thiobis(6-t-butyl-3-methylphenol), α-tocopherol, 2,2,4-trimethyl-6-hydroxy-7-t-butylchromane, tetrakis[methylene-3-(3',5'-di-t-butyl-4'-hydroxyphenyl)propionate]methane, pentaerythritol tetrakis[3-(3,5-di-t-butyl-4-hydroxyphenyl)propionate], and the like.

Examples of the phosphorus-based antioxidant include distearylpentaerythritol diphosphite, bis(2,4-di-t-butylphenyl)pentaerythritol diphosphite, tris(2,4-di-t-butylphenyl) phosphite, tetrakis(2,4-di-t-butylphenyl)-4,4'-biphenyl diphosphite, trinonylphenyl phosphite, and the like.

Examples of the sulfur-based antioxidant include distearyl thiodipropionate, dilauryl thiodipropionate and the like.

Examples of the UV absorber include a benzotriazole-based UV absorber, a benzoate-based UV absorber, a benzophenone-based UV absorber, an acrylate-based UV absorber, a metal complex-based UV absorber, and the like.

Examples of the light stabilizer include a hindered amine-based light stabilizer.

Examples of the near-infrared absorber include a cyanine-based near-infrared absorber; a pyrylium-based infrared absorber; a squarylium-based near-infrared absorber; a croconium-based infrared absorber; an azulenium-based near-infrared absorber; a phthalocyanine-based near-infrared absorber; a dithiol metal complex-based near-infrared absorber; a naphthoquinone-based near-infrared absorber; an anthraquinone-based near-infrared absorber; an indophenol-based near-infrared absorber; an azide-based near-infrared absorber; and the like.

Examples of the plasticizer include a phosphoric acid triester-based plasticizer, a fatty acid monobasic acid ester-based plasticizer, a dihydric alcohol ester-based plasticizer, an oxy acid ester-based plasticizer, and the like.

Examples of the antistatic agent include a fatty acid ester of a polyhydric alcohol, and the like.

Examples of the acid scavenger include magnesium oxide, zinc stearate, and the like.

Examples of the flame retardant include a halogenated organic compound; an organophosphorus compound such as red phosphorus, a condensed phosphate, a reactive phosphate, an ammonium polyphosphate-based compound and a metal phosphate-based compound; a melamine-based compound such as melamine phosphate and melamine cyanurate; and the like.

Examples of the flame retardant promoter include an inorganic hydroxide such as aluminum hydroxide and magnesium hydroxide; an inorganic oxide such as aluminum oxide hydrate and antimony oxide; a borate such as sodium borate, and the like.

These flame retardants and flame retardant promoters can be used alone or in combination of two or more kinds.

Respective contents of these additives may be appropriately determined depending on the purpose. Its content is normally 0.001 to 5 parts by weight, and preferably 0.01 to 1 part by weight based on the 100 parts by weight of the hydrogenated dicyclopentadiene ring-opening polymer (α).

The forming material used in the producing method according to one embodiment of the invention can be produced in accordance with an ordinary method.

For example, besides the hydrogenated dicyclopentadiene ring-opening polymer (α), the forming material containing other components can be obtained by mixing the components. As a mixing method, the components may be kneaded in a molten state.

The components can be kneaded using a melt mixer such as a single-screw extruder, a twin-screw extruder, a banbury mixer, a kneader and a feeder ruder. The kneading temperature is preferably in the range of 250 to 400° C., and more preferably 260 to 350° C. The components may be kneaded after adding the components at a time, or may be kneaded while adding the components stepwise.

After kneading, the resulting mixture may be extruded in the shape of a rod in accordance with an ordinary method, and cut using a strand cutter to have an appropriate length, and thus pelletization can be carried out.

[Method for Producing Resin-Formed Article]

The method for producing a resin-formed article according to one embodiment of invention includes melt-forming the forming material.

The hydrogenated dicyclopentadiene ring-opening polymer (a) included in the forming material tends to be inferior in solubility in common organic solvents. Thus, this forming material is not suitable as a forming material for a forming method using a solution such as a casting method.

On the other hand, the hydrogenated dicyclopentadiene ring-opening polymer (α) has a property of crystallizing in a short time when cooled in a molten state. Thereby, the desired resin-formed article can be produced with high productivity by forming the forming material including the hydrogenated dicyclopentadiene ring-opening polymer (α) using the melt forming method.

Examples of the melt forming method include an extrusion method, an injection forming method, a melt spinning forming method, a press forming method, a blow forming method, a calendaring method, and the like, and may be appropriately selected depending on the desired resin-formed d article.

(Resin Film)

When the resin-formed article is a resin film, the extrusion method is suitably used as a melt forming method.

When a resin film is produced by the extrusion method, a known method can be appropriately used. For example, the forming material may be put into an extruder, melt-kneaded, and then the molten resin may be continuously extruded from a T-die connected to the extruder to take a film form, and cooled to obtain a resin film.

The thickness of the resin film is not particularly limited, but is normally 1 to 300 μm, and preferably 2 to 200 μm.

Since this resin film includes the hydrogenated dicyclopentadiene ring-opening polymer (α), it has excellent heat resistance.

The resin film obtained by the extrusion method may be subjected to a stretching treatment or a heat setting treatment.

A resin film having high crystallinity and more excellent strength can be obtained by the stretching treatment. When the stretching treatment is carried out, the treatment can be effected by a uniaxial stretching method, a biaxial stretching method, a diagonal stretching method or the like.

The temperature of the resin film during the stretching treatment is normally 95 to 135° C., preferably 95 to 120° C.

The stretching ratio is preferably 10 or more, and more preferably 15 to 400 in area ratio.

The heat setting treatment means a treatment in which a predetermined heat is applied while a resin film is tensed by applying a tension in the longitudinal direction and the width direction. A resin film having a low thermal shrinkage can be obtained by the heat setting treatment.

The temperature of the resin film during the heat setting treatment is normally 120 to 230° C., and preferably 160 to 220° C.

The heat setting treatment time is normally 1 to 60 seconds.

A laminated film having a resin layer and a metal layer can be obtained by fusing the resulting resin film and a metal foil.

Examples of the metal constituting the metal foil include copper, gold, silver, stainless steel, aluminum, nickel, chromium and the like. Among them, copper is preferable because it provides a laminate useful as a substrate material.

The thickness of the metal foil is not particularly limited and can be appropriately determined depending on the intended purpose for the laminated film. The thickness of the metal foil is normally 1 to 35 μm, and preferably 3 to 18 μm.

The method of fusing a resin film and a metal foil is not particularly limited. The resin film and the metal foil can be fused with each other e.g. by a method in which the resin film and the metal foil are overlapped and hot-pressed (heat pressing method), or a method in which a resin film and a metal foil are overlapped and passed through heat rolls (heat roll method).

The resin layer of this laminated film contains a hydrogenated dicyclopentadiene ring-opening polymer (α). As described above, the hydrogenated dicyclopentadiene ring-opening polymer hydride (a) is crystallized from a molten state in a short time, and thus the fusion step in producing the laminated film can be completed in a short time.

In addition, this laminated film has excellent reflow heat resistance. Hence, this laminated film is preferably used as a flexible printed board.

(Injection-Formed Article)

Various injection-formed articles can be produced by using the injection forming method as the melt forming method.

When an injection-formed article is produced by the injection forming method, a known method can be appropriately used. For example, the forming material may be put into an extruder, melt-kneaded, and then the molten resin may be injected into a die connected to the extruder, and the molten resin in the die may be cooled for solidification, to obtain an injection-formed article.

Examples of the injection-formed article include an optical reflector, an insulating material, a connector, a food packaging material, a bottle, a pipe, a gear and the like.

Since these injection-formed articles contain the hydrogenated dicyclopentadiene ring-opening polymer (α), they have excellent heat resistance.

When an injection-formed article is produced by an injection forming method, it is preferable to use a forming material containing an inorganic filler. The use of a forming material containing an inorganic filler facilitates production of an injection-formed article having more excellent heat resistance. In addition, since the presence of the inorganic filler tends to enhance the crystallization of the hydrogenated dicyclopentadiene ring-opening polymer (α) in a molten state, the cooling time after injection into the die can be shortened, and the injection-formed article can be produced with higher productivity by using a forming material containing an inorganic filler.

(Fibrous Formed Article)

When the resin-formed article is a fibrous formed article, the melt spinning forming method is preferably used as the melt forming method.

When a fibrous formed article is produced by a melt spinning forming method, a known method can be appropriately used. For example, the forming material may be put into an extruder, melt-kneaded, and then a molten resin is continuously discharged from a spinning nozzle connected to the extruder, and cooled to obtain a fibrous formed article.

Since this fibrous formed article contains the hydrogenated dicyclopentadiene ring-opening polymer (α), it has excellent heat resistance.

The fibrous formed article obtained by the melt spinning forming method may be subjected to a stretching treatment.

The stretching treatment provides a fibrous formed article having high crystallinity and more excellent strength. The temperature of the fibrous formed article during the stretching treatment is normally 40 to 140° C., and preferably 40 to 120° C.

The stretching ratio is preferably 1.5 to 8.0.

EXAMPLES

Next, the invention will be further described below by way of examples, but the invention is not limited to the following examples.

Note that the following measurement methods and evaluation methods were used in connection with the examples.

(1) Number Average Molecular Weight of Dicyclopentadiene Ring-Opening Polymer

The ratio of the number of hydrogen atoms present at the terminals of the polymer chain to the number of hydrogen atoms present in the polymer chain excluding the terminals was calculated based on the $^1$H-NMR measurement results, and the number average molecular weight of the dicyclopentadiene ring-opening polymer was calculated based on the calculated ratio.

(2) Cis/Trans Content in Dicyclopentadiene Ring-Opening Polymer

A cis/trans content in the dicyclopentadiene ring-opening polymer was determined by $^1$H-NMR measurement.

(3) Hydrogenation Ratio of the Dicyclopentadiene Ring-Opening Polymer in Hydrogenation Reaction A hydrogenation ratio of the dicyclopentadiene ring-opening polymer in hydrogenation reaction was determined by $^1$H-NMR measurement.

(4) Melting Point and Initial Melting Point after Annealing of Hydrogenated Syndiotactic Crystalline Dicyclopentadiene Ring-Opening Polymer The hydrogenated dicyclopentadiene ring-opening polymer was molten by heating at 320° C. for 10 minutes, then cooled at 10° C./minute to room temperature to crystallize it, and then subjected to measurement by using a differential scanning calorimeter while heating at 10° C./minute. In an endothermic peak observed at the time of the measurement during heating, the temperature at which the endothermic (crystal melting) enthalpy was the largest was defined as the melting point, and the start temperature for the endothermic peak was determined as the initial melting point after annealing.

(5) Ratio of Racemo Diads in Hydrogenated Syndiotactic Crystalline Dicyclopentadiene Ring-Opening Polymer $^{13}$C-NMR measurement at 200° C. was carried out using o-dichlorobenzene-d$_4$/trichlorobenzene (mixing ratio (weight basis):1/2) as a solvent, and the ratio of the racemo diads was determined based on the a peak area value of the signal at 43.35 ppm derived from the meso diads and a peak area value of the signal at 43.43 ppm derived from the racemo diads.

(6) Reflow Resistance (Resin Film)

The reflow resistance of a resin film specimen obtained in Examples 1 and 2 or Comparative Example 1 was evaluated by heating the specimen at 260° C. for 10 seconds using an oven three times, and then visually observing the resin film specimen.

Here, a case where the resin film specimen having maintained its shape without deformation and melting before and after heating was rated as "Good", and a case where the specimen was visually deformed and melted was rated as "Bad".

(7) Reflow Resistance (Amount of Curvature after Reflow of the Injection-Formed Article)

The reflow resistance of a specimen obtained in Examples 3 to 5 or Comparative Examples 2 and 3 was evaluated by heating the specimen at 260° C. for 10 seconds using an oven three times, and then measuring the amount of curvature of the specimen. Here, a case where the amount of curvature was 0.8 mm or more may be rated as insufficient reflow resistance.

(8) Crystallization Rate

At the time of injection forming in Examples 3 to 5 or Comparative Examples 2 and 3, the crystallization rate of the forming material was evaluated by measuring the cooling time of the die required for the formed article to be released without deformation. Here, when the cooling time exceeds 40 seconds, the crystallization rate may be rated as being insufficient.

Synthesis Example 1

As a bispyrrolide precursor, 312 mg (0.5 mmol) of W(CHCMe$_2$Ph) (NAr$^{diMe}$) (Me$_2$Pyr)$_2$ (wherein Me represents a methyl group, Ph represents a phenyl group, Ar$^{diMe}$ represents a 2,6-dimethylphenyl group, and Me$_2$Pyr represents 2, 5-dimethylpyrrole) was dissolved in 5 ml of benzene, to which 80 µl (0.5 mmol) of α,α-bistrifluoromethylbenzyl alcohol [Ph (CF$_3$)$_2$COH] was added, and the whole content (reaction mixture) was stirred at room temperature (20° C.) for 30 minutes. Then, 90 mg (0.5 mmol) of 1,10-phenanthroline was added, the whole content was stirred at room temperature (20° C.) for 1 hour, and then the reaction mixture was transferred to a freezer. 10 ml of pentane was added to the reaction mixture to quantitatively precipitate the reaction product. The reaction product was taken by filtration as an orange solid. This product was washed with pentane and dried. The yield was 480 mg (quantitatively).

This product was identified as (2-trifluoromethyl-2-phenyl-1,1,1-trifluoroethoxy)-2,6-dimethylphenylimide tungsten (VI) (2,5-dimethylpyrrolide) (neophylidene) (1,10-phenanthroline) (a compound represented by the following formula (A)) by $^1$H-NMR, $^{13}$C-NMR and $^{19}$F-NMR spectra of the resulting compound.

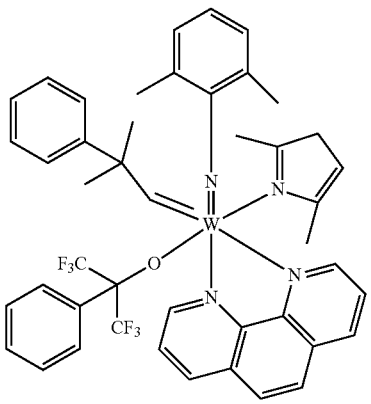

(A)

Synthesis Example 2

As a bispyrrolide precursor, 337 mg (0.5 mmol) of W(CHCMe$_2$Ph) (NAr$^{diiPr}$) (Me$_2$Pyr)$_2$ (wherein Me represents a methyl group, Ph represents a phenyl group, Ar$^{diiPr}$ represents a 2,6-diisopropylphenyl group, and Me$_2$Pyr represents 2, 5-dimethylpyrrole) was dissolved in 5 ml of benzene, to which 84 µl (0.5 mmol) of α,α-bistrifluoromethylbenzyl alcohol [Ph(CF$_3$)$_2$COH] was added, and the whole content (reaction mixture) was stirred at room temperature (20° C.) for 2 hours. Then, 90 mg (0.5 mmol) of 1,10-phenanthroline was added, the whole content was stirred at room temperature (20° C.) for 1 hour, and then the reaction mixture was transferred to a freezer. 10 ml of pentane was added to the reaction mixture to quantitatively precipitate the reaction product. The reaction product was taken by filtration as an orange solid. This product was washed with pentane and dried. The yield was 490 mg (quantitatively).

This product was identified as (2-trifluoromethyl-2-phenyl-1,1,1-trifluoroethoxy)-2,6-diisopropylphenylimide tungsten (VI) (2,5-dimethylpyrrolide) (neophylidene) (1,10-phenanthroline) (a compound represented by the following formula (B)) by $^1$H-NMR, $^{13}$C-NMR and $^{19}$F-NMR spectra of the resulting solid.

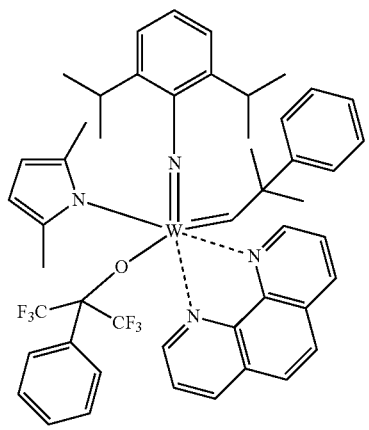

(B)

Synthesis Example 3

A glass reactor equipped with a stirrer was charged with 1.35 parts of a tungsten(2,6-dimethylphenylimido)tetrachloride and 21 parts of diethyl ether, and the mixture was cooled to −78° C. Furthermore, 0.74 parts of 3,3',5,5'-tetramethyl-2,2'-biphenol dissolved in 21 parts of diethyl ether was added to the mixture. The resulting mixture was slowly heated to 0° C., and reacted while the temperature was maintained at 0° C. for 24 hours. After completion of the reaction, diethyl ether was distilled off to obtain a dark reddish violet solid material.

To the resulting solid material, 13 parts of hexane and 4.2 parts of diethyl ether were added, which was then cooled to −78° C., and allowed to stand for 1 hour to precipitate microcrystalline insolubles. A soluble part was filtered off, the remaining insolubles was further washed with 6.6 parts of hexane, and then the solvent was distilled off to obtain 1.84 parts of a compound.

$^1$H-NMR spectrum of this compound was measured in a C$_6$D$_6$ solvent, and as a result, this compound was found to be a compound represented by the following formula (C).

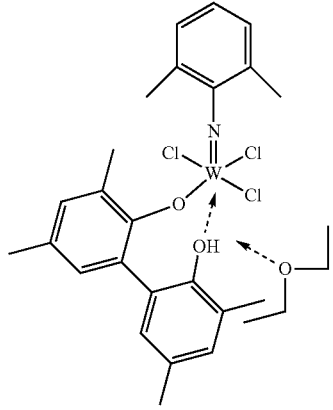

(C)

Production Example 1

A glass reactor equipped with a stirrer was charged with 0.072 g (1/500 mol/mol) of (2-trifluoromethyl-2-phenyl-1,1,1-trifluoroethoxy)-2,6-dimethylphenylimide tungsten (VI) (2,5-dimethylpyrrolide) (neophylidene) (1,10-phenanthroline) obtained in Synthesis Example 1 and 1 g of toluene, to which 5.0 g of dicyclopentadiene, 20.0 g of cyclohexane and 0.21 g of 1-hexene were subsequently added, and furthermore 0.0105 g of anhydrous zinc chloride dissolved in 5 g of 1,4-dioxane was added, which was subjected to polymerization reaction at 50° C. After the start of the polymerization reaction, white turbidness of 1,10-phenanthroline zinc was rapidly produced. After 3-hour reaction, a large quantity of acetone was poured into the polymerization reaction solution to aggregate a precipitate, the aggregate was filtered off, washed, and then dried at 40° C. for 24 hours under reduced pressure. A dicyclopentadiene ring-opening polymer (A) obtained had a yield of 4.3 g, had a number average molecular weight of 14,000, and had a cis content of 97%.

Subsequently, an autoclave equipped with a stirrer was charged with 1.75 g of the dicyclopentadiene ring-opening polymer (A) and 47 g of cyclohexane, to which 0.00157 g of RuHCl(CO)(PPh$_3$)$_3$ dispersed in 10 ml of cyclohexane was further added, which was subjected to hydrogenation reaction at 160° C. for 8 hours under a hydrogen pressure of 4.0 MPa. This hydrogenation reaction solution was poured into a large quantity of acetone to completely precipitate the resulting hydrogenated ring-opening polymer, which was filtered off, washed, and then dried at 40° C. for 24 hours under reduced pressure.

The hydrogenation ratio of the resulting hydrogenated ring-opening polymer (A) was 99% or more, and the ratio of racemo diads was 92%. As a result of measuring the melting point of the hydrogenated product, the melting point was 284° C., the melting enthalpy was 52 J/g, and the initial melting point after annealing was 274° C.

Production Example 2

A glass reactor equipped with a stirrer was charged with 0.076 g (1/500 mol/mol) of (2-trifluoromethyl-2-phenyl-1,1,1-trifluoroethoxy)-2,6-diisopropylphenylimide tungsten (VI) (2,5-dimethylpyrrolide) (neophylidene) (1,10-phenanthroline) obtained in Synthesis Example 2 and 1 g of toluene, to which 5.0 g of dicyclopentadiene, 20.0 g of cyclohexane and 0.21 g of 1-hexene were subsequently added, and furthermore 0.0105 g of anhydrous zinc chloride dissolved in 5 g of 1,4-dioxane was added, which was subjected to polymerization reaction at 50° C. After the start of the polymerization reaction, white turbidity of 1,10-phenanthroline zinc was rapidly produced. After 3-hour reaction, a large quantity of acetone was poured into the polymerization reaction solution to aggregate a precipitate, the aggregate was filtered off, washed, and then dried at 40° C. for 24 hours under reduced pressure. A dicyclopentadiene ring-opening polymer (B) obtained had a yield of 4.3 g, had a number average molecular weight of 10,900, and had a cis content of 81%.

Subsequently, the hydrogenated ring-opening polymer (B) was obtained by the same hydrogenation reaction as in Production Example 1 except that the dicyclopentadiene ring-opening polymer (B) was used instead of the dicyclopentadiene ring-opening polymer (A).

The hydrogenation ratio of the hydrogenated ring-opening polymer (B) was 99% or more, and the ratio of racemo diads was 91%. As a result of measuring the melting point of the hydrogenated product, the melting point was 274° C., the melting enthalpy was 28 J/g, and the initial melting point after annealing was 265° C.

Production Example 3

A glass reactor equipped with a stirrer was charged with 0.082 g of the compound represented by Formula (C) obtained in Synthesis Example 3 and 3.5 g of toluene, and cooled to −78° C., to which a solution prepared by dissolving 0.027 g of diethylaluminium chloride in 0.87 g of toluene was added, heated to 0° C., and reacted at 0° C. for 1 hour to obtain a mixture containing a catalyst.

To the resulting mixture, 7.5 g of dicyclopentadiene, 23 g of toluene and 0.65 g of 1-octene were added, which was then subjected to polymerization reaction at 0° C. for 24 hours. A large quantity of methanol was poured into the resulting polymerization reaction solution to aggregate a precipitate, the aggregate was filtered off, washed, and then dried at 40° C. for 24 hours under reduced pressure to obtain 7.4 g of a dicyclopentadiene ring-opening polymer (C). The polymer had a number average molecular weight of 42,000, and a cis content of 93%.

Subsequently, the hydrogenated ring-opening polymer (C) was obtained by the same hydrogenation reaction as in Production Example 1 except that the dicyclopentadiene ring-opening polymer (C) was used instead of the dicyclopentadiene ring-opening polymer (A).

The hydrogenation ratio of the hydrogenated ring-opening polymer (C) was 99% or more, and the ratio of racemo diads was 80%. As a result of measuring the melting point of the hydrogenated product, the melting point was 270° C., the melting enthalpy was 49 J/g, and the initial melting point after annealing was 258° C.

TABLE 1

|  | Production Example | | |
|---|---|---|---|
|  | 1 | 2 | 3 |
| Hydrogenated ring-opening polymer | (A) | (B) | (C) |
| Ratio of raceme (%) | 92 | 91 | 88 |
| Melting point (Tm) (° C.) | 284 | 274 | 270 |
| Initial melting point after annealing (° C.) | 274 | 265 | 258 |

Example 1

1.1 parts of tetrakis[methylene-3-(3',5'-di-t-butyl-4'-hydroxyphenyl)propionate]methane (Irganox® 1010, manufactured by BASF Japan) as an antioxidant was mixed with 100 parts of the hydrogenated ring-opening polymer (A) obtained in Production Example 1 to obtain a raw composition. This raw composition was put into a twin-screw extruder (TEM-37B, manufactured by TOSHIBA MACHINE CO., LTD.) having 4 die holes with an inner diameter of 3 mm to obtain a formed article in a shape of a strand by a thermal melt extrusion method, which was cooled, and then shredded by a strand cutter to obtain a resin pellet.

The operating conditions for the twin-screw extruder are shown below.
Set temperature of barrel: 270 to 280° C.
Set temperature of die: 270° C.
Screw rotation: 145 rpm
Feeder rotation: 50 rpm The resulting resin pellet was formed into a film with a thickness of 150 μm and a width of 120 mm by a thermal melt extruding film former equipped with a T-die (Measuring Extruder Type Me-20/2800 V3, manufactured by Optical Control System GmbH), and the resulting unstretched film was wound into a roll at a rate of 2 m/minute.

The operating conditions for the film former are shown below.
Set temperature of barrel: 280 to 290° C.
Temperature of die: 270° C.
Screw rotation: 30 rpm The unstretched film was cut into a square of 90 mm×90 mm at an arbitrary site, then placed in a compact stretcher (Type EX10-B, manufactured by Toyo Seiki Seisaku-sho, Ltd.), and stretched under conditions of stretching temperature: 100° C., stretching ratio: 2.0×2.0 and stretching rate: 10,000 mm/minute.

Subsequently, the resulting stretched film was fixed to an iron plate, which was heated in an oven at 200° C. for 20 minutes to obtain a resin film specimen.

The reflow resistance of the resulting resin film specimen was evaluated. The results of the evaluation are shown in Table 2.

Example 2

A resin film specimen was produced in the same way as Example 1 except that the hydrogenated ring-opening polymer (B) obtained in Production Example 2 was used instead of the hydrogenated ring-opening polymer (A) obtained in Production Example 1, and the reflow resistance was evaluated. The results of the evaluation are shown in Table 2.

Comparative Example 1

A resin film specimen was produced in the same way as Example 1 except that the hydrogenated ring-opening polymer (C) obtained in Production Example 3 was used instead of the hydrogenated ring-opening polymer (A) obtained in Production Example 1, and the reflow resistance was evaluated. The results of the evaluation are shown in Table 2.

Example 3

1.1 parts of tetrakis[methylene-3-(3',5'-di-t-butyl-4'-hydroxyphenyl)propionate]methane (Irganox® 1010, manufactured by BASF Japan) as an antioxidant was mixed with 100 parts of the hydrogenated ring-opening polymer (A) obtained in Production Example 1 to obtain a raw composition. This raw composition was put into a twin-screw extruder (TEM-37B, manufactured by TOSHIBA MACHINE CO., LTD.) having 4 die holes with an inner diameter of 3 mm to obtain a formed article in a shape of a strand by a thermal melt extrusion method, which was cooled, and then shredded by a strand cutter to obtain a resin pellet.

The operating conditions for the twin-screw extruder are shown below.

Set temperature of barrel: 270 to 280° C.
Set temperature of die: 270° C.
Screw rotation: 145 rpm
Feeder rotation: 50 rpm The resulting resin pellet was formed into an injection-formed article (specimen) with a length of 80 mm, a width of 50 mm and a thickness of 1 mm by an injection molding machine (ROBOSHOT S2000i-50A, manufactured by FUNUC CORPORATION) under conditions of a forming temperature of 290° C., an injection pressure of 0.8 MPa and a die temperature of 150° C. The amount of curvature of the resulting specimen after reflow was measured. The measurement results are shown in Table 2.

Example 4

An injection-formed article was obtained in the same way as Example 3 except that a raw material composition was obtained by mixing 100 parts of the hydrogenated ring-opening polymer (A) obtained in Production Example 1, 33 parts of a glass fiber (trade name: "CSG 3PA-830", manufactured by Nitto boseki Co., Ltd.) and 0.8 parts of antioxidant (tetrakis[methylene-3-(3',5'-di-tert-butyl-4'-hydroxyphenyl) propionate]methane in Example 3, and the amount of curvature after reflow was measured. The measurement results are shown in Table 2.

Example 5

An injection-formed article was obtained in the same way as Example 3 except that the hydrogenated ring-opening polymer (B) obtained in Production Example 2 was used instead of the hydrogenated ring-opening polymer (A) obtained in Production Example 1, in Example 3, and the amount of curvature after reflow was measured. The measurement results are shown in Table 2.

Comparative Example 2

An injection-formed article was obtained in the same way as Example 3 except that the hydrogenated ring-opening polymer (C) obtained in Production Example 3 was used instead of the hydrogenated ring-opening polymer (A) obtained in Production Example 1, in Example 3, and the amount of curvature after reflow was measured. The measurement results are shown in Table 2.

Comparative Example 3

An injection-formed article was obtained in the same way as Example 4 except that the hydrogenated ring-opening polymer (C) obtained in Production Example 3 was used instead of the hydrogenated ring-opening polymer (A) obtained in Production Example 1, in Example 4, and the amount of curvature after reflow was measured. The measurement results are shown in Table 2.

TABLE 2

|  | Example | | Comparative Example | Example | | | Comparative Example | |
| --- | --- | --- | --- | --- | --- | --- | --- | --- |
|  | 1 | 2 | 1 | 3 | 4 | 5 | 2 | 3 |
| Hydrogenated ring-opening polymer (A) (parts) | 100 | — | — | 100 | 100 | — | — | — |
| Hydrogenated ring-opening polymer (B) (parts) | — | 100 | — | — | — | 100 | — | — |
| Hydrogenated ring-opening polymer (C) (parts) | — | — | 100 | — | — | — | 100 | 100 |
| Glass fiber (parts) | — | — | — | — | 33 | — | — | 33 |
| Forming method | Extrusion | | | Injection forming | | | | |
| resin-formed article | Resin film | | | Injection-formed article | | | | |
| Reflow resistance (resin film) | good | good | bad | — | — | — | — | — |
| Amount of curvature of the injection-formed article after reflow (mm) | — | — | — | 0.4 | 0.1 | 0.6 | 1.5 | 1.0 |
| Cooling time for injection forming (sec.) | — | — | — | 20 | 15 | 24 | 40 | 30 |

The followings are found from Table 2.

The resin films of Examples 1 and 2 have reflow resistances superior to the resin film of Comparative Example 1.

Likewise, the injection-formed articles of Examples 3 to 5 have reflow resistances superior to the injection-formed articles of Comparative Examples 2 and 3.

Furthermore, in Examples 3 to 5, the cooling time for the die during the injection forming is short, and the productivity is excellent.

Particularly, in Examples 3 to 5, the use of the forming material containing the glass fiber allows production of the injection-formed article having an excellent reflow resistance, with high productivity.

The invention claimed is:

1. A method for producing a resin-formed article, the method comprising
   adding a hydrogenation catalyst and then hydrogen to a system including a dicyclopentadiene ring-opening polymer to thereby hydrogenate the carbon-carbon double bond present in the dicyclopentadiene ring-opening polymer,
   obtaining a forming material including a hydrogenated syndiotactic crystalline dicyclopentadiene ring-opening polymer with an initial melting temperature of 265° C. or higher and a syndiotacticity higher than 90% from the system, and
   melt-forming the forming material,
   wherein the hydrogenation catalyst is selected from a group consisting of $RuHCl(CO)(PPh_3)_3$, $RuHCl(CO)[P(p\text{-Me-Ph})_3]_3$, $RuHCl(CO)(PCy_3)_2$, $RuHCl(CO)[P(n\text{-Bu})_3]_3$, $RuHCl(CO)[P(i\text{-Pr})_3]_2$, $RuH_2(CO)(PPh_3)_3$, $RuH_2(CO)[P(p\text{-Me-Ph})_3]_3$, $RuH_2(CO)(PCy_3)_3$, $RuH_2(CO)[P(n\text{-Bu})_3]_3$ $RuH(OCOCH_3)(CO)(PPh_3)_2$, $RuH(OCOPh)(CO)(PPh_3)_2$, $RuH(OCOPh\text{-}CH)(CO)(PPh_3)_2$, $RuH(OCOPh\text{-}OCH_3)(CO)(PPh_3)_2$, $RuH(OCOPh)(CO)(PCy_3)_2$, Raney nickel, nickel diatomaceous earth, nickel acetate, palladium acetate, $PdCl_2$, and $RhCl(PPh_3)_3$.

2. The method for producing the resin-formed article according to claim 1, wherein the forming material further includes an inorganic filler.

3. A method for producing a resin film, the method comprising:
   adding a hydrogenation catalyst and then hydrogen to a system including a dicyclopentadiene ring-opening polymer to thereby hydrogenate the carbon-carbon double bond present in the dicyclopentadiene ring-opening polymer,
   obtaining a forming material including a hydrogenated syndiotactic crystalline dicyclopentadiene ring-opening polymer with an initial melting temperature of 265° C. or higher and a syndiotacticity higher than 90% from the system, and
   extrusion-forming the forming material,
   wherein the hydrogenation catalyst is selected from a group consisting of $RuHCl(CO)(PPh_3)_3$, $RuHCl(CO)[P(p\text{-Me-Ph})_3]_3$, $RuHCl(CO)(PCy_3)_2$, $RuHCl(CO)[P(n\text{-Bu})_3]_3$, $RuHCl(CO)[P(i\text{-Pr})_3]_2$, $RuH_2(CO)(PPh_3)_3$, $RuH_2(CO)[P(p\text{-Me-Ph})_3]_3$, $RuH_2(CO)(PCy_3)_3$, $RuH_2(CO)[P(n\text{-Bu})_3]_3$ $RuH(OCOCH_3)(CO)(PPh_3)_2$, $RuH(OCOPh)(CO)(PPh_3)_2$, $RuH(OCOPh\text{-}CH)(CO)(PPh_3)_2$, $RuH(OCOPh\text{-}OCH_3)(CO)(PPh_3)_2$, $RuH(OCOPh)(CO)(PCy_3)_2$, Raney nickel, nickel diatomaceous earth, nickel acetate, palladium acetate, $PdCl_2$, and $RhCl(PPh_3)_3$.

4. A method for producing an injection-formed article, the method comprising:
   adding a hydrogenation catalyst and then hydrogen to a system including a dicyclopentadiene ring-opening polymer to thereby hydrogenate the carbon-carbon double bond present in the dicyclopentadiene ring-opening polymer,
   obtaining a forming material including a hydrogenated syndiotactic crystalline dicyclopentadiene ring-opening polymer with an initial melting temperature of 265° C. or higher and a syndiotacticity higher than 90% from the system, and
   injection-forming the forming material,
   wherein the hydrogenation catalyst is selected from a group consisting of $RuHCl(CO)(PPh_3)_3$, $RuHCl(CO)[P(p\text{-Me-Ph})_3]_3$, $RuHCl(CO)(PCy_3)_2$, $RuHCl(CO)[P(n\text{-Bu})_3]_3$, $RuHCl(CO)[P(i\text{-Pr})_3]_2$, $RuH_2(CO)(PPh_3)_3$, $RuH_2(CO)[P(p\text{-Me-Ph})_3]_3$, $RuH_2(CO)(PCy_3)_3$, $RuH_2(CO)[P(n\text{-Bu})_3]_3$ $RuH(OCOCH_3)(CO)(PPh_3)_2$, $RuH(OCOPh)(CO)(PPh_3)_2$, $RuH(OCOPh\text{-}CH)(CO)(PPh_3)_2$, $RuH(OCOPh\text{-}OCH_3)(CO)(PPh_3)_2$, $RuH(OCOPh)(CO)(PCy_3)_2$, Raney nickel, nickel diatomaceous earth, nickel acetate, palladium acetate, $PdCl_2$, and $RhCl(PPh_3)_3$.

5. The method for producing an injection-formed article according to claim 4, wherein a cooling time after the injection-forming is 15 seconds or more and 24 seconds or less.

* * * * *